US010838993B2

(12) United States Patent
Boguraev et al.

(10) Patent No.: US 10,838,993 B2
(45) Date of Patent: Nov. 17, 2020

(54) AUGMENT POLITENESS IN QUESTION ANSWER SYSTEMS

(71) Applicant: International Business Machines Corporation, Armonk, NY (US)

(72) Inventors: Branimir K. Boguraev, Bedford, NY (US); Swaminathan Chandrasekaran, Coppell, TX (US); Bharath Dandala, White Plains, NY (US); Lakshminarayanan Krishnamurthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 15/396,977

(22) Filed: Jan. 3, 2017

(65) Prior Publication Data

US 2018/0189630 A1    Jul. 5, 2018

(51) Int. Cl.
*G06F 16/33*     (2019.01)
*G06N 5/04*      (2006.01)
*G06F 16/90*     (2019.01)
*G06F 16/9032*   (2019.01)

(52) U.S. Cl.
CPC .... *G06F 16/3344* (2019.01); *G06F 16/90332* (2019.01); *G06N 5/04* (2013.01)

(58) Field of Classification Search
CPC .... G06F 16/334; G06F 16/90332; G06N 5/04
See application file for complete search history.

(56) References Cited

U.S. PATENT DOCUMENTS

| 4,652,242 | A   | 3/1987 | Johnson |
| 2004/0153337 | A1* | 8/2004 | Cruze ............... G06F 21/32 705/2 |
| 2009/0228441 | A1  | 9/2009 | Sandvik |
| 2010/0185437 | A1* | 7/2010 | Visel ............... G06F 40/30 704/9 |
| 2012/0130934 | A1  | 5/2012 | Brillhart et al. |
| 2013/0238318 | A1* | 9/2013 | Enoki ............... G06F 17/277 704/9 |
| 2015/0074095 | A1* | 3/2015 | Enders ............... G06F 16/2477 707/725 |

(Continued)

OTHER PUBLICATIONS

Jiarpakdee, Jirayus, Akinori Ihara, and Ken-ichi Matsumoto. "Understanding question quality through affective aspect in Q&A site." In 2016 IEEE/ACM 1st International Workshop on Emotional Awareness in Software Engineering (SEmotion), pp. 12-17. IEEE, 2016. (Year: 2016).*

(Continued)

*Primary Examiner* — Eric Nilsson
*Assistant Examiner* — Urmana Islam
(74) *Attorney, Agent, or Firm* — Van Leeuwen & Van Leeuwen; Ingrid M. Foerster

(57) ABSTRACT

An approach is provided to receive, at a question answering (QA) system, a question and identify a politeness corresponding to a number of terms corresponding to the question that are included in a corpus of the QA system. The approach identifies the politeness of one or more terms included in each of a set of candidate answers responsive to the question. Finally, the approach scores each of the candidate answers, with the scoring being based, in part, on the politeness identified for each of the terms.

6 Claims, 7 Drawing Sheets

(56) References Cited

U.S. PATENT DOCUMENTS

2015/0099257 A1* 4/2015 Kozloski ............ G06F 16/24522
434/362
2015/0100521 A1 4/2015 Kozloski et al.

OTHER PUBLICATIONS

Kourtellis et al., "Method and System for Detecting Abusive Users in Community Question Answering Platforms," IP.com Electronic Publication, Jan. 15, 2015, IP.com No. IPCOM000240232D, 12 pages.

Anonymous, "A method to detect pattern in documents and add annotation to documents to implement intelligent question and answer system," IP.com Electronic Publication, May 26, 2014, IP.com No. IPCOM000236999D, 7 pages.

Anonymous, "Projection based scoring of candidate answers in a question answering system," IP.com Electronic Publication, Oct. 27, 2014, IP.com No. IPCOM000239281D, 4 pages.

* cited by examiner

US 10,838,993 B2

AUGMENT POLITENESS IN QUESTION ANSWER SYSTEMS

BACKGROUND

In today's information world, a wide variety of content is ingested into Question Answering (QA) systems ranging from resources like online encyclopedias, social media data stores, blogs, and the like. QA systems find evidence from the ingested corpora and present such data to the end user exactly how it exists and is represented in the ingested corpora. Oftentimes, content ingested into the QA system, especially from open domain sources such as social media and blogs, which is contributed voluntarily by contributors with little or no oversight lacks politeness. Data resulting from the QA system, therefore, may contain data or answers formed in a manner that is not polite and that consequently may offend some end users. Such negative use of QA systems may result in users trusting the QA system less and also may result in end users not wishing to use the QA system.

BRIEF SUMMARY

An approach is provided to receive, at a question answering (QA) system, a question and identify a politeness corresponding to a number of terms corresponding to the question that are included in a corpus of the QA system. The approach identifies the politeness of one or more terms included in each of a set of candidate answers responsive to the question. Finally, the approach scores each of the candidate answers, with the scoring being based, in part, on the politeness identified for each of the terms.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
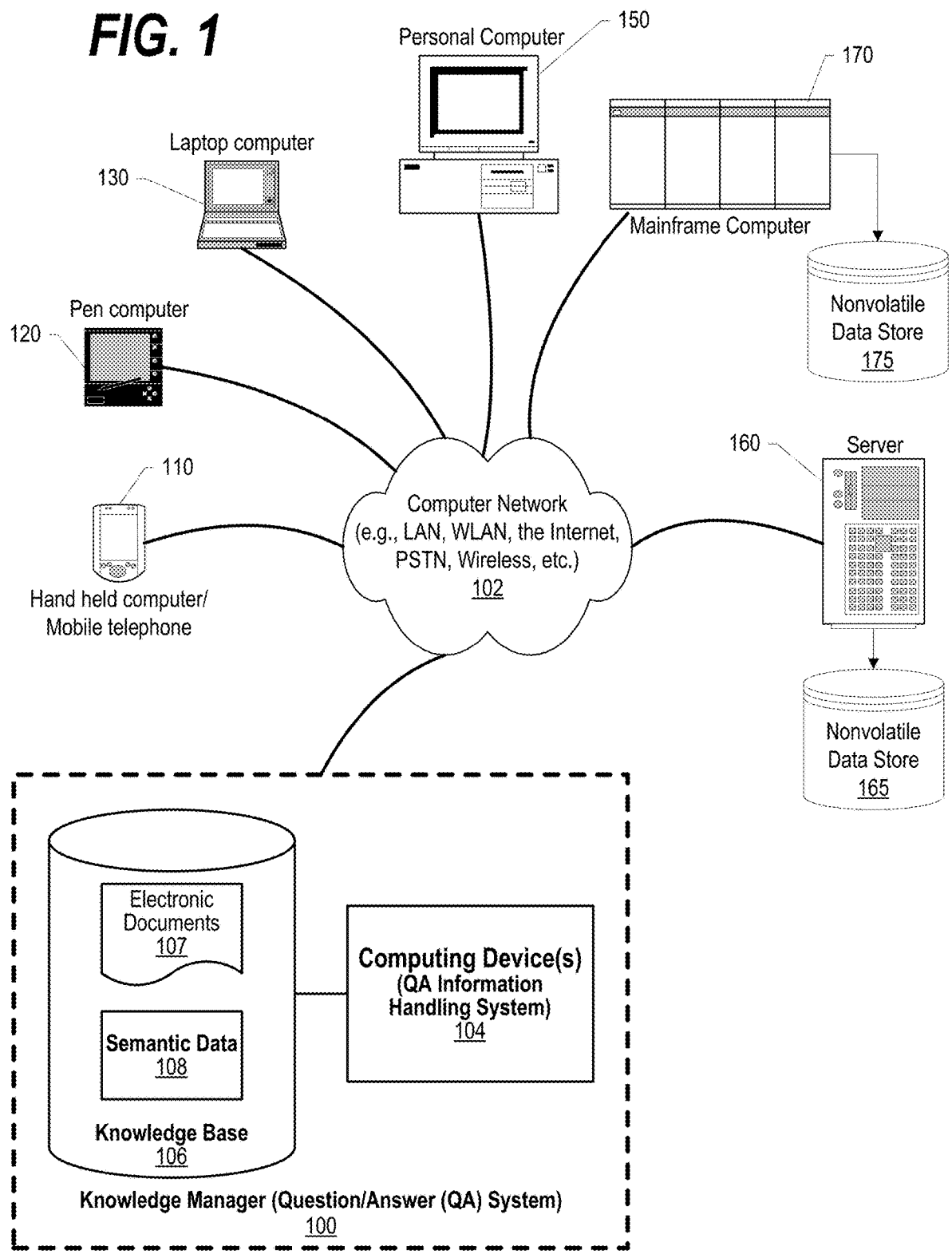
FIG. 1 depicts a schematic diagram of one illustrative embodiment of a question/answer creation (QA) system in a computer network.

FIGS. 1-7 depict an approach that provides answers from a QA system more politely. The approach uses an automatic construction of monolingual POLITE vs IMPOLITE parallel corpora. The approach also uses the statistical machine translation approaches to solve this problem of translating impolite language to polite language. The approach uses state-of-art machine translation techniques such as non-linear classifiers to solve the problem. In one embodiment, the source language is "IMPOLITE" language and target language is "POLITE" language. To this end the approach automatically collects polite versus impolite parallel/comparable corpora and relies on existing machine translation models plus non-linear classifiers to accurately train a system that enables us to translate impolite language to polite language.

The approach is motivated by general observations that people exhibit tendencies to pay attention, and follow, authority figures, and that people are persuaded by those that they like, respect, and trust. A QA system has greater influence if it is perceived, instinctively, as such an "authority figure". As a consequence, this generates a need for a QA system to be emotionally engaged with its users, and therefore able to be generally 'polite' and 'kind', as well as aware of the social, and/or individual, context of interaction. In practice, the QA system modulate its behavior to adapt in ways such that it can 'change register to socially acceptable, i.e. "polite"', 'be aware of not "dropping bomb-shells"', 'avoid diluting the essence of a response by quoting original sentiment', and so forth—some such capabilities are exemplified by the sample interactions cited below. Consider the following examples:

In a first example, consider a case where we have an evidence from a document for a question about a car's feature saying "This car drives me nuts as it lacks the feature to stream audio via bluetooth". Presenting the same sentence to the end user is not recommended since it is impolite and may hurt the brand perception for that particular car company. The approach provided herein modifies the answer and presents it in a polite way, such as "Please consider another car because this car doesn't come with the requested feature".

In a second example, consider a question posed to a QA system: "My WBC count is elevated and feeling dizzy always. What could be the possible symptoms?". In the ingested corpus one of the potential symptom for these could be leukemia. However, presenting such a dire possible outcome would be impolite and might result in increased anxiety and stress to the user. Instead, using this approach, the QA system would respond with a more polite response such as "Please consult your doctor immediately. It could be as severe as leukemia".

We use a lexicon of impolite vs polite words and bootstrap a corpus in a similar domain or about a similar concept, such as when considering the reviews of a product that are available in the Internet. The approach bootstraps the reviews of the same product using both the polite and impolite words. After obtaining the boot-strapped corpora (which is not parallel but comparable) the approach applies monolingual corpus/sentence alignment techniques to identify polite to impolite (one versus more) aligned sentences using structural and contextual features. After building this corpora the approach learns a statistical machine translation model on a monolingual parallel/comparable text corpora. Finally the approach provides a learned translation model that helps in translating an impolite answer to a polite answer.

In one embodiment, the approach first builds a politeness classifier using several semantic and syntactic features. Similar to n-best translations obtained in machine translation, the approach obtains n-best phrasal translations for a given sentence using paraphrasal resources and statistical machine translation models. Along with the n-best translation, the approach obtains a confidence metric for each of the n-best phrasal translations. The confidence metric obtained here indicates how well the phrasal translation obtained is aligned with the original sentence. The approach then tests each of the n-best phrasal translations against the politeness classifier which results in a confidence metric indicating the politeness of the phrasal translation. Using the two metrics (one indicating the righteousness of paraphrased sentence and other indicating the politeness of the sentence) as features, the approach provides a machine learning model. In the test phase, the above ML model for each of the sentences assigns an augmented confidence that uses the proposed two metrics that results in polite sentence and also rightly align sentence.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

The QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
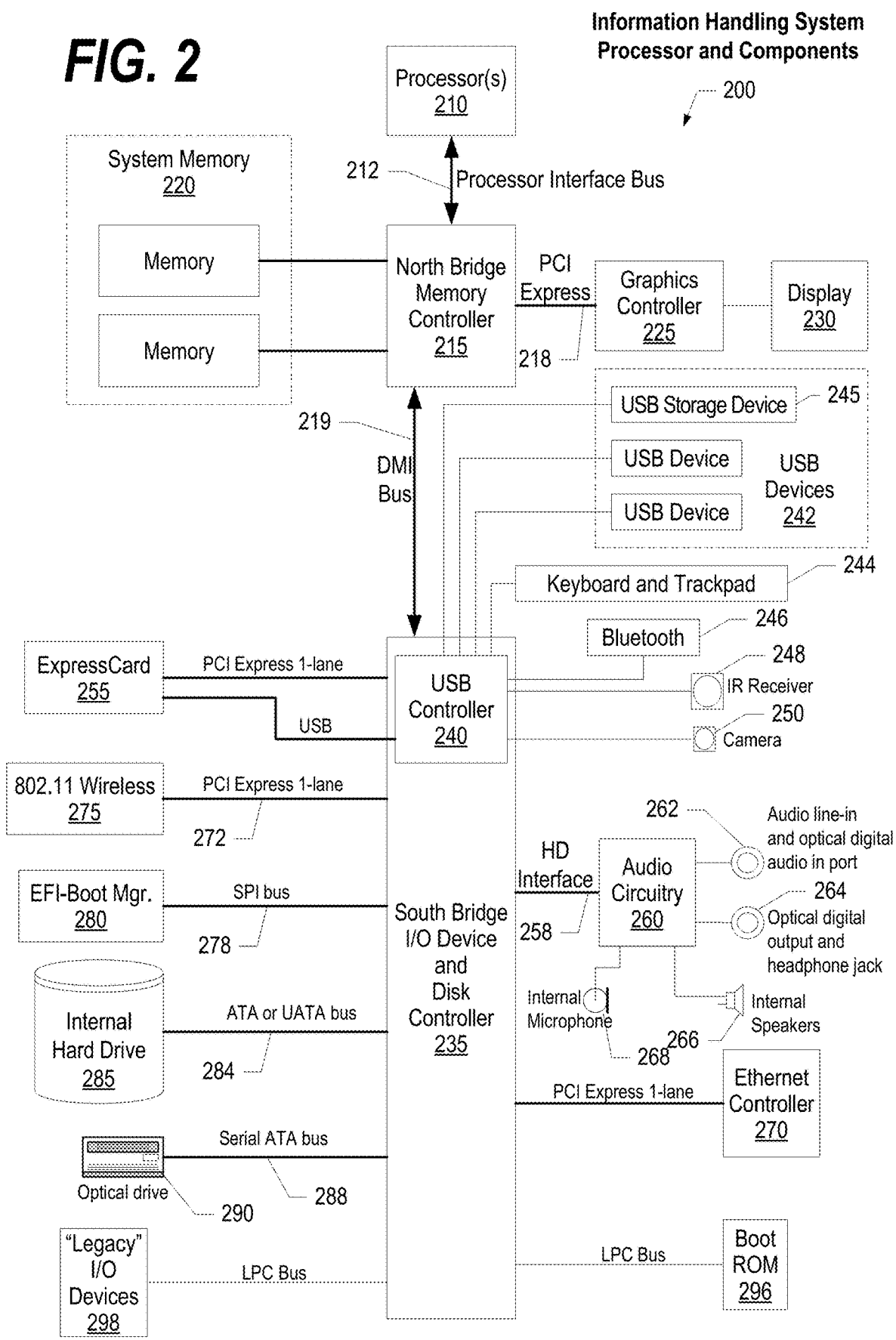
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
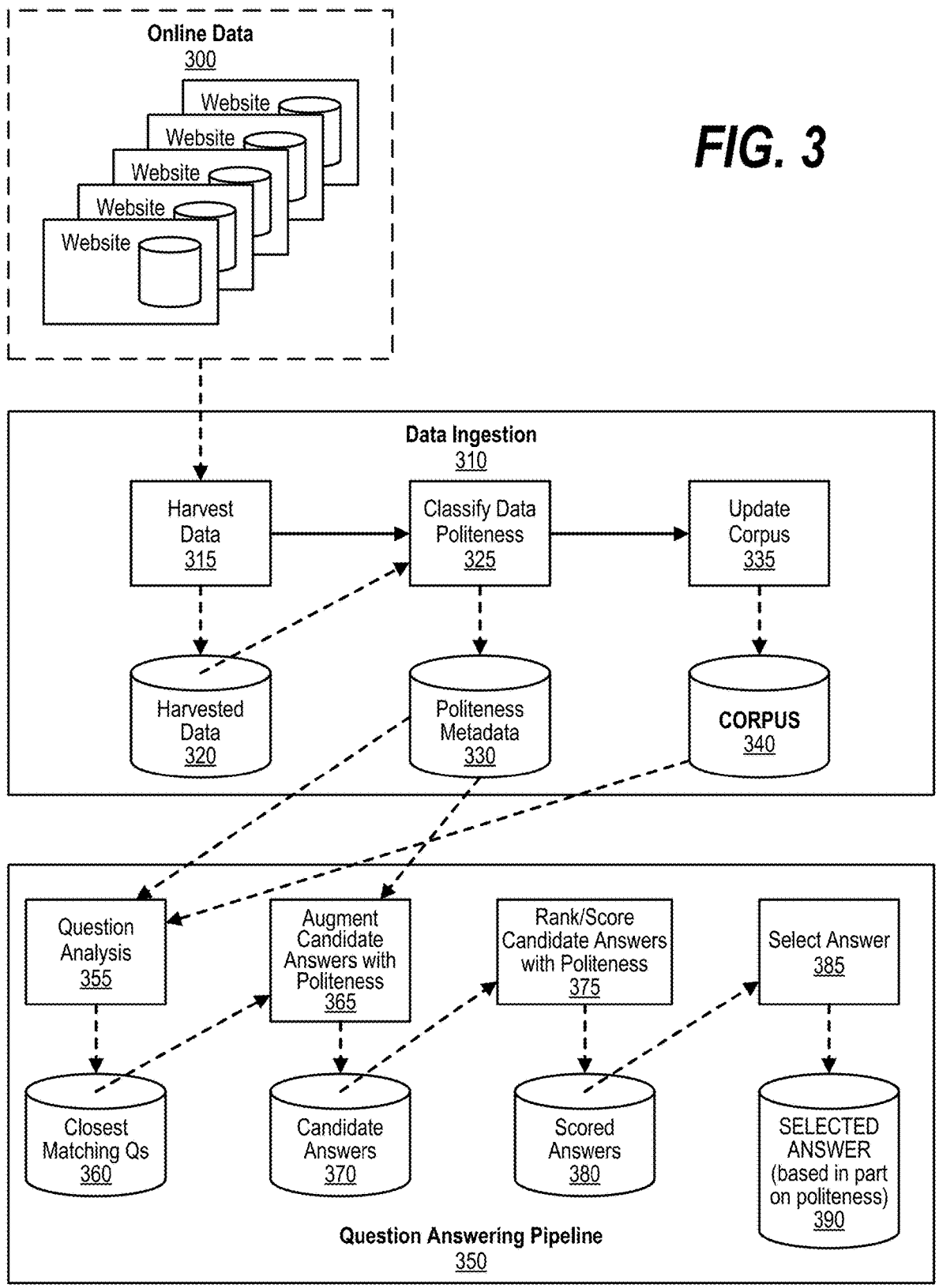
FIG. 3 is a component diagram depicting the various components in applying a level of politeness to statements to influence confidence ranking of such statements.

FIG. 3 is a component diagram depicting the various components in applying a level of politeness to statements to influence confidence ranking of such statements. Web sites 300 can include any number of web sites with various types of material and content. Discussion ingestion phase 310 is used to gather data from web sites 300 and update a corpus (corpus 340) that is utilized by the question answering system. The question answering phase is handled by question answering pipeline 350 that utilizes the corpus provided by the discussion ingestion phase in order to identify candidate answers as well as to select the most likely answer from the candidate answers.

Discussion ingestion 310 commences with process 315 that harvests the data from web sites 300 stores the harvested material in data store 320. Next, process 325 is used to classify the politeness of the material that was harvested during process 315. The result of process 325 is politeness metadata that describes the politeness of data included in harvested data 320. In one embodiment, a subject matter expert is used to help identify politeness metadata pertaining to a particular field that is covered by corpus 340. The politeness metadata is stored in data store 330. Finally, process 335, updates the corpus used by the question answering system. Process 335 utilizes the politeness metadata from data store 330 in order to provide a politeness and related confidence level to data that is included in the corpus which is stored in data store 340.

Question answering pipeline 350 commences with process 355 that performs a question analysis using the updated corpus that is stored in data store 340. The question analysis results in one or more questions that most closely match the requested question. In one embodiment, questions are also augmented using politeness metadata based on the terms found in the question. The closest matching questions are stored in data store 360. Next, process 365 augments candidate answers using politeness data corresponding to the terms in the candidate answers. The process annotates such candidate answers using politeness metadata retrieved from data store 330. The candidate answers are stored in data store 370.

Process 375 is performed to rank and score the candidate answers using a variety of factors, including politeness metadata pertaining to the candidate answers. For example, if a question regarding a person's weight may have various candidate answer with some of the candidate answers being more respectful, or polite, than other candidate answers. For a different type of answer characteristic, such a possible disease that the user might be diagnosed as having, a different set of politeness data would be used to augment the candidate answer to make the candidate answer more polite. Scores of the candidate answers are based on the "correctness" of the respective candidate answers as well as the determined "politeness" of the candidate answers.

The result of process 375 is a set of scored candidate answers that are stored in data store 380. Finally, process 385 selects the most likely correct answer, or answers, based on the scores (e.g., the candidate answer with the highest score, etc. with the score being based on both the correctness of the answer as well as the politeness of the answer). The candidate answer that is the highest scored answer is stored in data store 390 and is conveyed to a user of the question answering system as the most likely correct answer to the question posed by the user.

Figure 4:
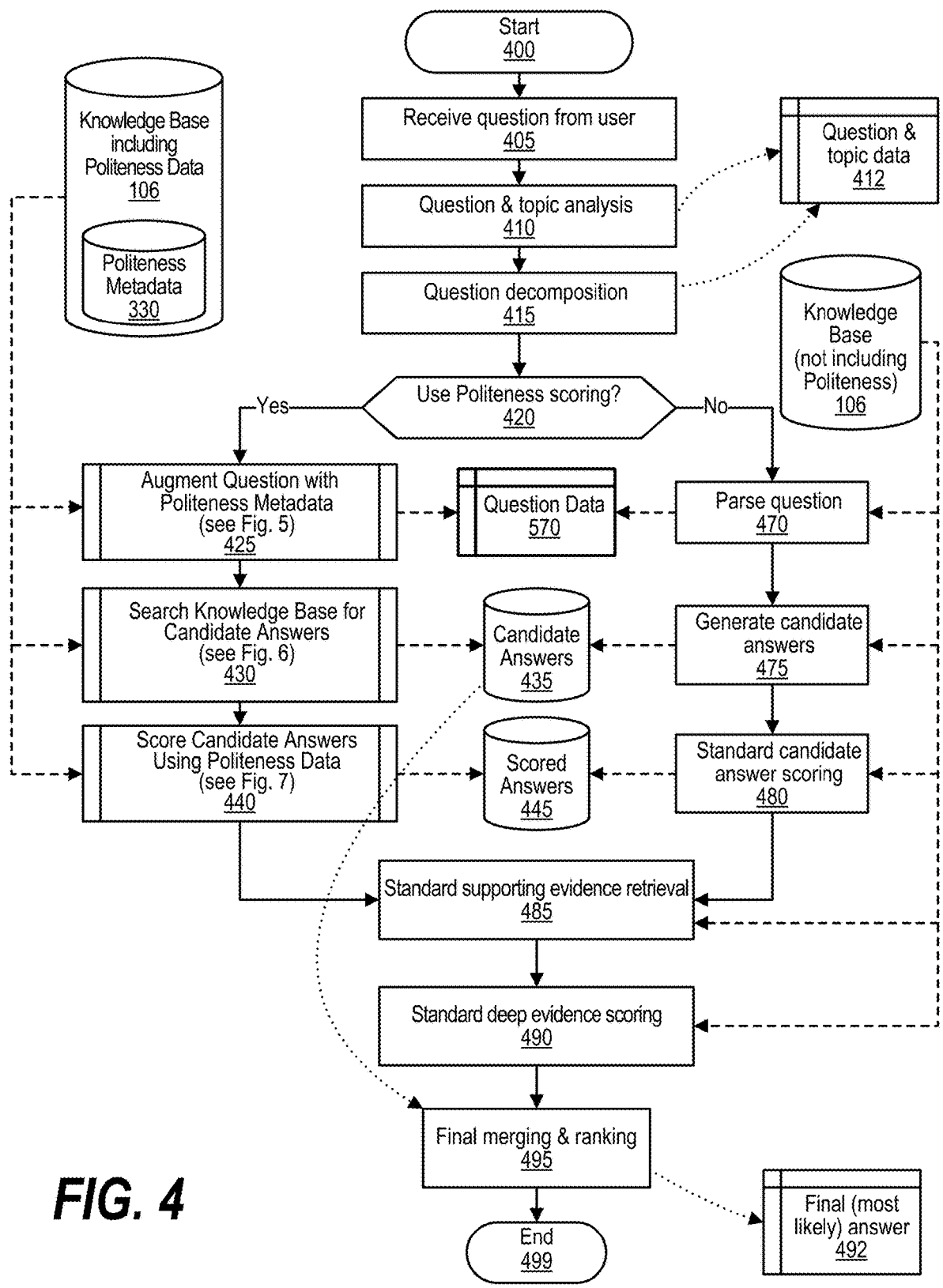
FIG. 4 is an exemplary high level flowchart that performs steps to/which/that apply a level of politeness to statements to influence confidence rankings.

FIG. 4 is an exemplary high level flowchart that performs steps apply a level of politeness to statements to influence confidence rankings. Processing commences at 400 whereupon, at step 405, the process receives a question from a user. At step 410, the process performs a question and topic analysis process to generate question and topic data. Process 410 stores the question and topic data in memory area 412. At step 415, the process performs a decomposition process on the question. The question decomposition results in additional data being stored to memory area 410. Decomposition results may also include terms of the question that can be analyzed based on politeness metadata.

The process determines as to whether to use politeness scoring when processing the user's question (decision 420). In one embodiment, the user specifies, such as with using an option, as to whether politeness scoring will be used, while in another embodiment, the determination of whether to use politeness scoring is based on the type of question posed to the system. If politeness scoring is being used, then decision 420 branches to the 'yes' branch to perform steps 425 through 440. On the other hand, if politeness scoring is not being used, then decision 420 branches to the 'no' branch to perform steps 470 through 480.

When politeness scoring is being utilized, steps 425 through 440 are performed. At predefined process 425, the process performs the Annotate Question with Politeness Metadata routine (see FIG. 5 and corresponding text for processing details). Predefined process 425 retrieves the politeness metadata from the corpus (data store 106) that includes politeness metadata store 330. Predefined process 425 stores the question data in memory area 570. At predefined process 430, the process performs the Search Knowledge Base Candidate Answers routine (see FIG. 6 and corresponding text for processing details). Predefined process 430 receives data from corpus 106 and outputs the candidate answers to data store 435. At predefined process 440, the process performs the Score Candidate Answers Using Politeness Data routine (see FIG. 7 and corresponding text for processing details). The politeness data to score the candidate answers is retrieved from corpus 106 and the resulting scored candidate answers are stored in data store 445.

When politeness scoring is not being used, the process performs steps 470 through 480. At step 470, the process parses question and stores the parsed question data in memory area 570. At step 475, the process generates candidate answers using the traditional process without using politeness metadata and stores the resulting candidate answers in data store 435. At step 480, the process performs standard candidate answer scoring using the traditional process and stores the scored answers in data store 445.

After the question has been processed either by using politeness scoring with steps 425 through 440 or without politeness scoring using steps 470 through 480, steps 485, 490, and 495 is performed. At step 485, the process retrieves standard supporting evidence for the candidate answers. At step 490, the process scores the retrieved deep evidence. At step 495, the process performs a final merging and ranking process and stores the most likely answer, or answer, in memory area 492 along with the confidence scores of the final answer(s). FIG. 4 processing thereafter ends at 499.

Figure 5:
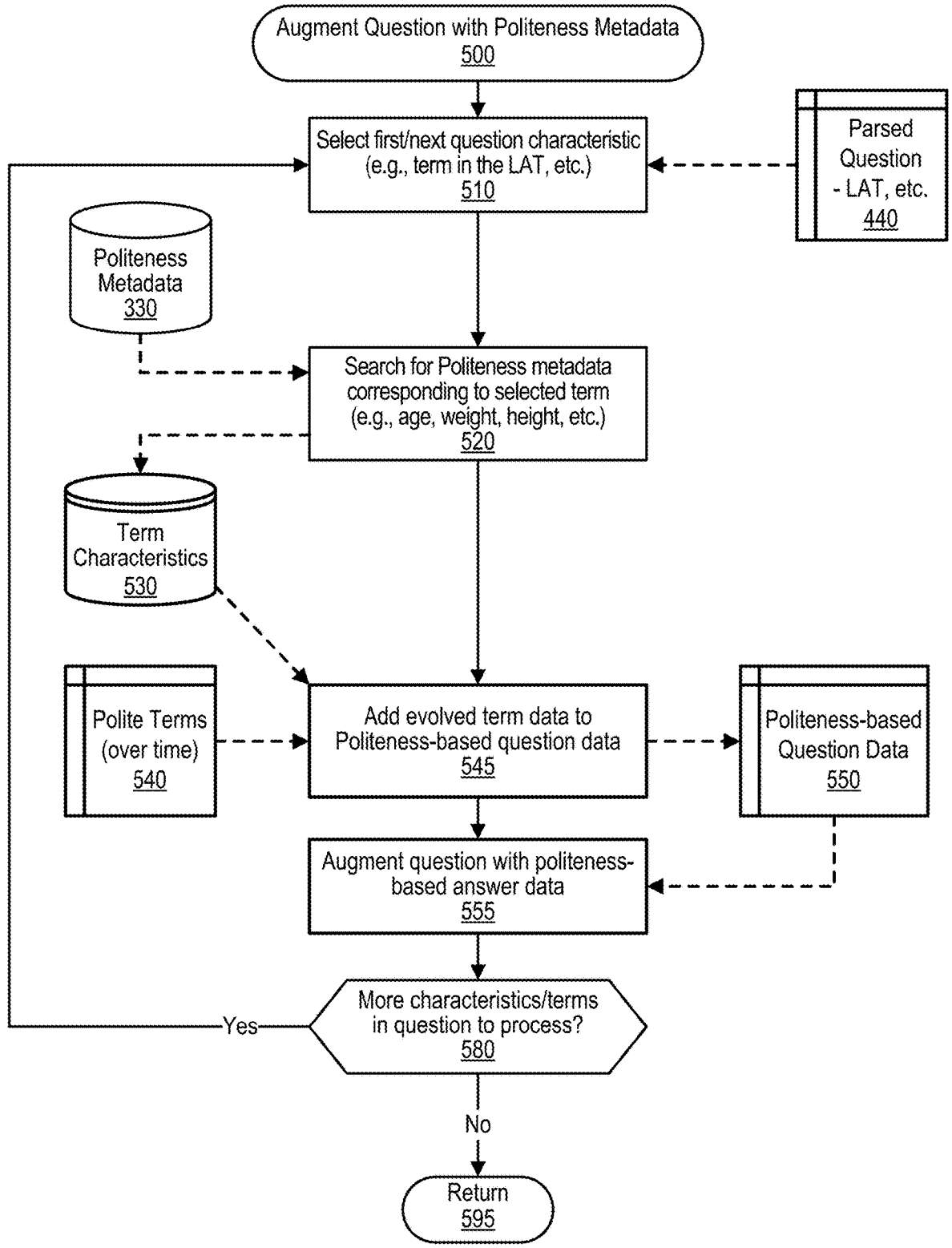
FIG. 5 is an exemplary flowchart that performs steps to annotate a question using politeness metadata.

FIG. 5 is an exemplary flowchart that performs steps to annotate a question using politeness metadata. Processing commences at 500, whereupon, at step 510, the process selects the first question characteristic (e.g., a term in the Lexical Answer Type (LAT), term in the focus, etc.). Step 510 retrieves the question characteristic data from parsed question data stored in memory area 440.

At step 520, the process searches for politeness metadata corresponding to the selected term, or question characteristic (e.g., age, weight, disease, etc.). Step 520 retrieves the politeness metadata from data store 330. Step 520 stores the term characteristics and any associated politeness metadata in data store 530.

At step 545, the process adds the evolved term data to the politeness-based question data that is stored in memory area 550. Term characteristics 525 includes time-based politeness data that recognizes that some terms evolve over time from being relatively "polite" terms to "impolite" terms and vise versa. Memory area 540 stores polite terms over time with some terms, or words, evolving from "polite" terms to "impolite" terms and vise versa. The politeness-based question data resulting from step 545 is then stored in memory area 570. At step 555, the question is augmented using the politeness-based metadata stored in memory area 550.

The process determines as to whether there are more characteristics and/or terms related to the question that need to be processed (decision 580). If there are more characteristics and/or terms related to the question that need to be processed, then decision 580 branches to the 'yes' branch which loops back to step 510 to select and process the next question characteristic from memory area 440. This looping continues until all of the question characteristics have been processed, at which point decision 580 branches to the 'no' branch and processing returns to the calling routine (see FIG. 4) at 595.

Figure 6:
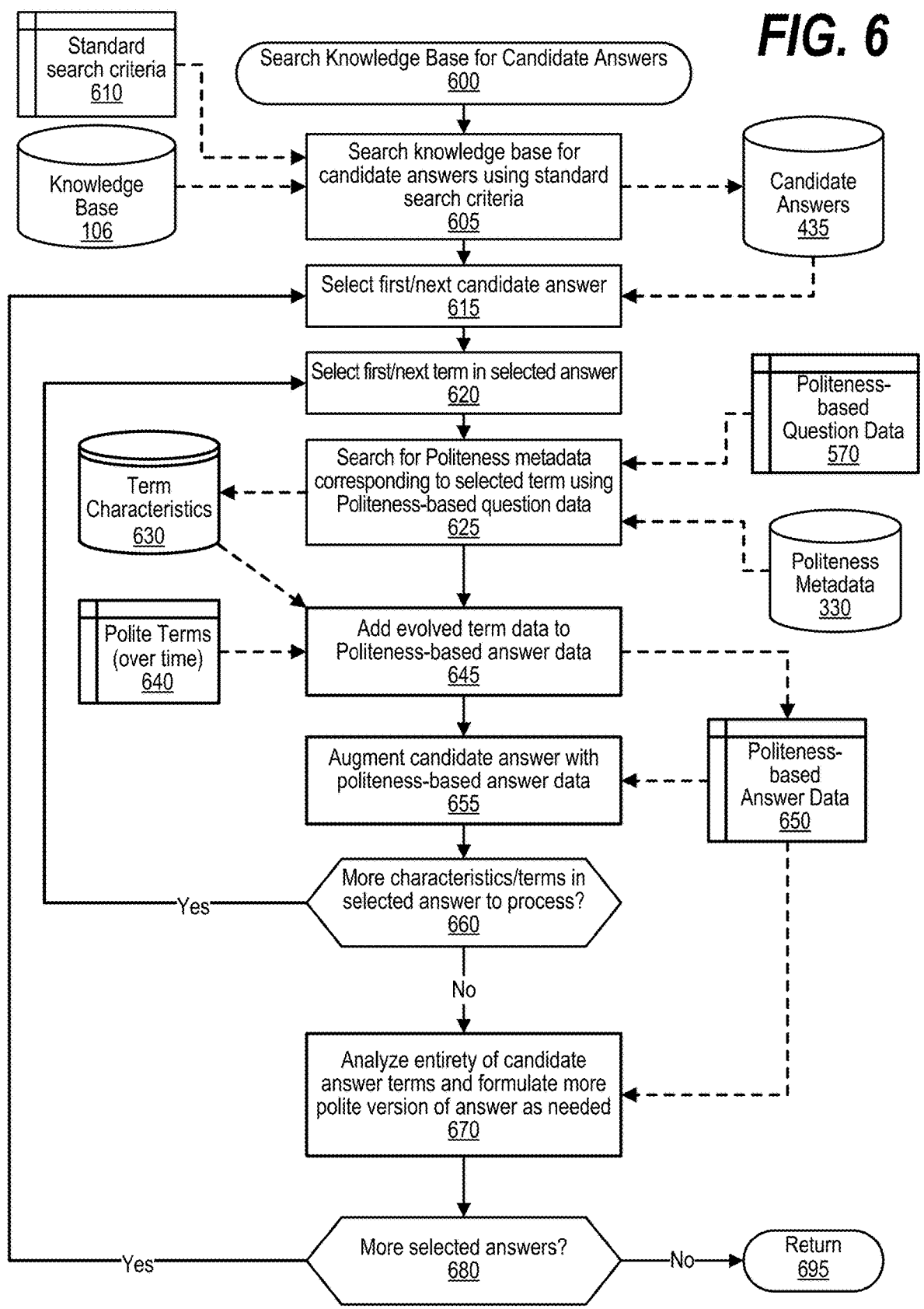
FIG. 6 is an exemplary flowchart that performs steps that utilize politeness metadata when searching a knowledge base for candidate answers.

FIG. 6 is an exemplary flowchart that performs steps that utilize politeness metadata when searching a knowledge base for candidate answers. Processing commences at 600, whereupon at step 605, the process searches knowledge base 106 for candidate answers using standard search criteria retrieved from memory area 610. The resulting candidate answers are stored in data store 435. At step 615, the process selects the first candidate answer from data store 435. At step 620, the process selects the first term included in the selected answer. As used herein, the word 'term' can refer to a word, a phrase, an expression, or the like.

At step 625, the process searches for politeness metadata that corresponds to the selected term using politeness-based question data retrieved from memory area 570 and from politeness metadata retrieved from data store 330. Step 625 stores the politeness metadata found for the term in characteristics data store 630.

At step 620, the process searches for politeness metadata corresponding to the selected term, or candidate answer characteristic (e.g., age, weight, disease, etc.). Step 620 retrieves the politeness metadata from data store 330. Step 620 stores the term characteristics and any associated politeness metadata in data store 630.

At step 645, the process adds the evolved term data to the politeness-based candidate answer data that is stored in memory area 650. Term characteristics 625 includes time-based politeness data that recognizes that some terms evolve over time from being relatively "polite" terms to "impolite" terms and vise versa. Memory area 640 stores polite terms over time with some terms, or words, evolving from "polite" terms to "impolite" terms and vise versa. The politeness-based candidate answer data resulting from step 645 is then stored in memory area 670. At step 655, the candidate answer is augmented using the politeness-based metadata stored in memory area 650.

The process determines as to whether there are more characteristics and/or terms included in the selected candidate answer to process (decision 660). If there are more characteristics and/or terms included in the selected candidate answer to process, then decision 660 branches to the 'yes' branch which loops back to step 620 to select and process the next term from the selected candidate answer. This looping continues until there are no more characteristics and/or terms included in the selected candidate answer to process, at which point decision 660 branches to the 'no' branch. At step 670, a final analysis of the candidate answer terms in their entirety, rather than in a term-by-term context, is performed to further modify and annotate the candidate answer with more polite terms.

The process determines as to whether there are more candidate answers to process (decision 680). If there are more candidate answers to process, then decision 680 branches to the 'yes' branch whereupon processing loops back to step 615 to select and process the next candidate answer. This looping continues until there are no more candidate answers to process, at which point decision 680 branches to the 'no' branch and processing returns to the calling routine (see FIG. 4) at 695.

Figure 7:
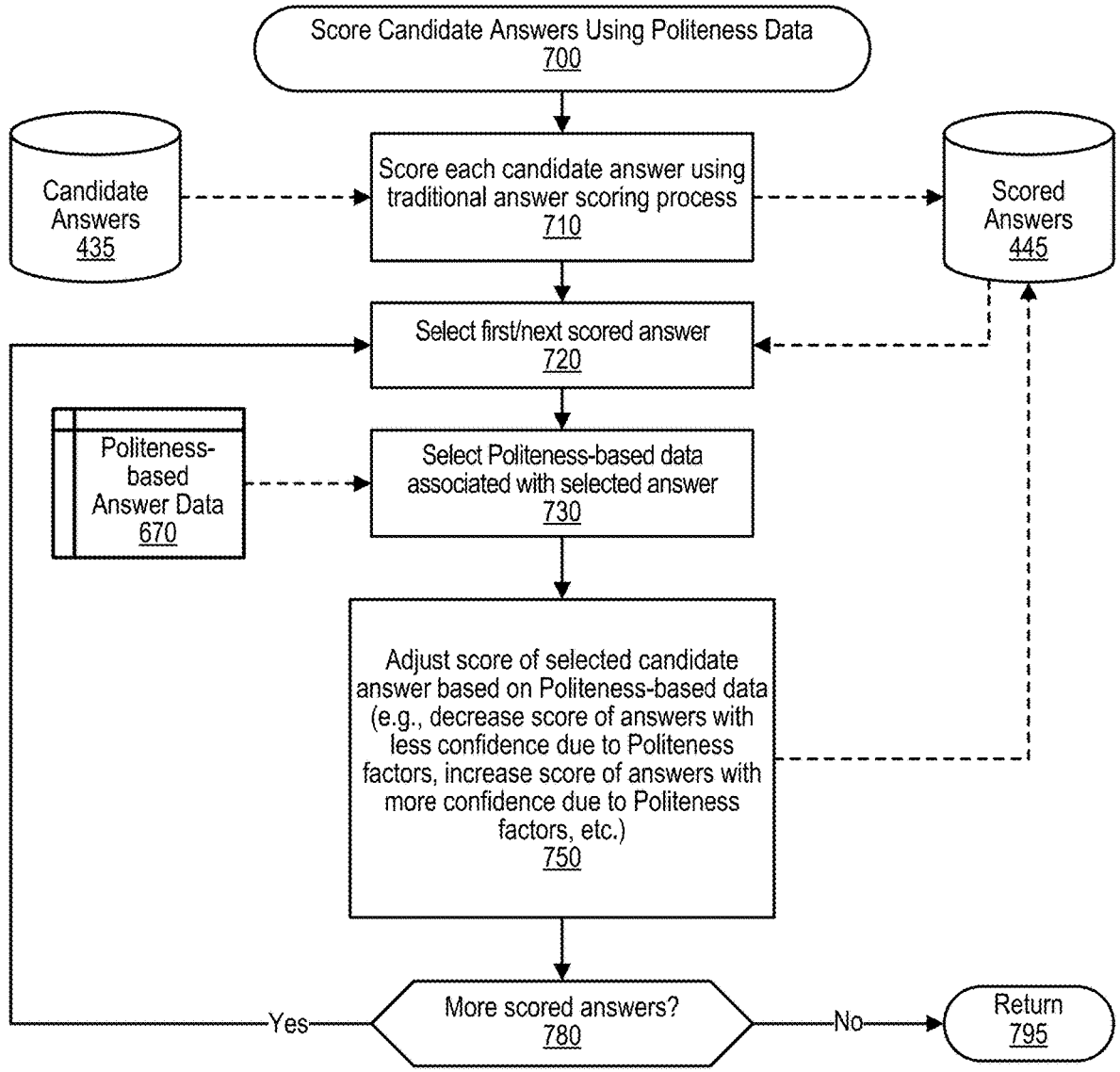
FIG. 7 is an exemplary flowchart that performs steps that scores candidate answers utilizing associated politeness metadata.

FIG. 7 is an exemplary flowchart that performs steps that scores candidate answers utilizing associated politeness metadata. Processing commences at 700, whereupon, at step 710, the process scores each candidate answer using a traditional answer scoring process. The candidate answers are retrieved from data store 435 and the scored candidate answers are stored in data store 445.

At step 720, the process selects the first scored candidate answer from data store 445. At step 730, the process selects the politeness-based data associated with the selected answer with the politeness-based data being retrieved from memory area 670. At step 750, the process adjusts the score of selected candidate answer based on politeness-based data (e.g., decrease score of answers with less confidence due to politeness factors, increase score of answers with more confidence due to politeness factors, etc.). For example, if the candidate answer relates to the weight of an individual, the confidence of the answer may be increased if the candidate answer was derived from more polite sources of evidence, and decreased if the candidate answer includes impolite terms. The adjustment to the candidate answer's score is stored in data store 445.

The process determines as to whether there are more scored candidate answers to process (decision 780). If there are more scored candidate answers to process, then decision 780 branches to the 'yes' branch which loops back to select and process the next scored candidate answer. This looping continues until there are no more scored candidate answers to process, at which point decision 780 branches to the 'no' branch and processing returns to the calling routine (see FIG. 4) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   classifying data ingested into a question answering (QA) system, wherein the classifying comprises determining a politeness corresponding to one or more terms included in the data, and wherein the classifying results in politeness metadata, including a level of politeness, corresponding to each of the one or more terms;
   storing the politeness metadata corresponding to the one or more terms in a corpus utilized by the QA system;
   receiving, at the QA system, a question;
   identifying one or more question characteristics based on one or more question terms in the received question;
   comparing the question characteristics to the politeness metadata stored in the corpus, wherein the comparing results in one or more politeness term characteristics;
   augmenting the received question with the politeness term characteristics;

searching the corpus for a plurality of candidate answers to the augmented question;

retrieving the politeness metadata corresponding to one or more terms included in the plurality of candidate answers to the augmented question;

retrieving evolved term data for at least one of the one or more terms included in the plurality of candidate answers, wherein the evolved term data indicates a change in the politeness of the at least one term over time; and scoring each of the plurality of candidate answers, wherein the scoring is based on the retrieved politeness metadata and the retrieved evolved term data.

2. The method of claim 1 further comprising:

augmenting at least one of the candidate answers with politeness-based data pertaining to one or more terms found in the at least one candidate answer, wherein the politeness-based data includes the politeness metadata and the evolved term data pertaining to the one or more terms.

3. An information handling system comprising:

one or more processors;

one or more data stores accessible by at least one of the processors;

a memory coupled to at least one of the processors; and a set of computer program instructions stored in the memory and executed by at least one of the processors in order to perform actions of:

classifying data ingested into a question answering (QA) system, wherein the classifying comprises determining a politeness corresponding to one or more terms included in the data, and wherein the classifying results in politeness metadata, including a level of politeness, corresponding to each of the one or more terms;

storing the politeness metadata corresponding to the one or more terms in a corpus utilized by the QA system;

receiving, at the QA system, a question;

identifying one or more question characteristics based on one or more question terms in the received question;

comparing the question characteristics to the politeness metadata stored in the corpus, wherein the comparing results in one or more politeness term characteristics;

augmenting the received question with the politeness term characteristics;

searching the corpus for a plurality of candidate answers to the augmented question;

retrieving the politeness metadata corresponding to one or more terms included in the plurality of candidate answers to the augmented question;

retrieving evolved term data for at least one of the one or more terms included in the plurality of candidate answers, wherein the evolved term data indicates a change in the politeness of the at least one term over time; and scoring each of the plurality of candidate answers, wherein the scoring is based on the retrieved politeness metadata and the retrieved evolved term data.

4. The information handling system of claim 3 wherein the actions further comprise:

augmenting at least one of the candidate answers with politeness-based data pertaining to one or more terms found in the at least one candidate answer, wherein the politeness-based data includes the politeness metadata and the evolved term data pertaining to the one or more terms.

5. A computer program product stored in a computer readable storage medium, comprising computer program code that, when executed by an information handling system, causes the information handling system to perform actions comprising:

classifying data ingested into a question answering (QA) system, wherein the classifying comprises determining a politeness corresponding to one or more terms included in the data, and wherein the classifying results in politeness metadata, including a level of politeness, corresponding to each of the one or more terms;

storing the politeness metadata corresponding to the one or more terms in a corpus utilized by the QA system;

receiving, at the QA system, a question;

identifying one or more question characteristics based on one or more question terms in the received question;

comparing the question characteristics to the politeness metadata stored in the corpus, wherein the comparing results in one or more politeness term characteristics;

augmenting the received question with the politeness term characteristics;

searching the corpus for a plurality of candidate answers to the augmented question;

retrieving the politeness metadata corresponding to one or more terms included in the plurality of candidate answers to the augmented question;

retrieving evolved term data for at least one of the one or more terms included in the plurality of candidate answers, wherein the evolved term data indicates a change in the politeness of the at least one term over time; and scoring each of the plurality of candidate answers, wherein the scoring is based on the retrieved politeness metadata and the retrieved evolved term data.

6. The computer program product of claim 5 wherein the actions further comprise:

augmenting at least one of the candidate answers with politeness-based data pertaining to one or more terms found in the at least one candidate answer, wherein the politeness-based data includes the politeness metadata and the evolved term data pertaining to the one or more terms.

* * * * *